E. WELDON.
AUTOMATICALLY ADJUSTABLE VEHICLE LAMP.
APPLICATION FILED MAR. 13, 1917.
1,248,964.
Patented Dec. 4, 1917.
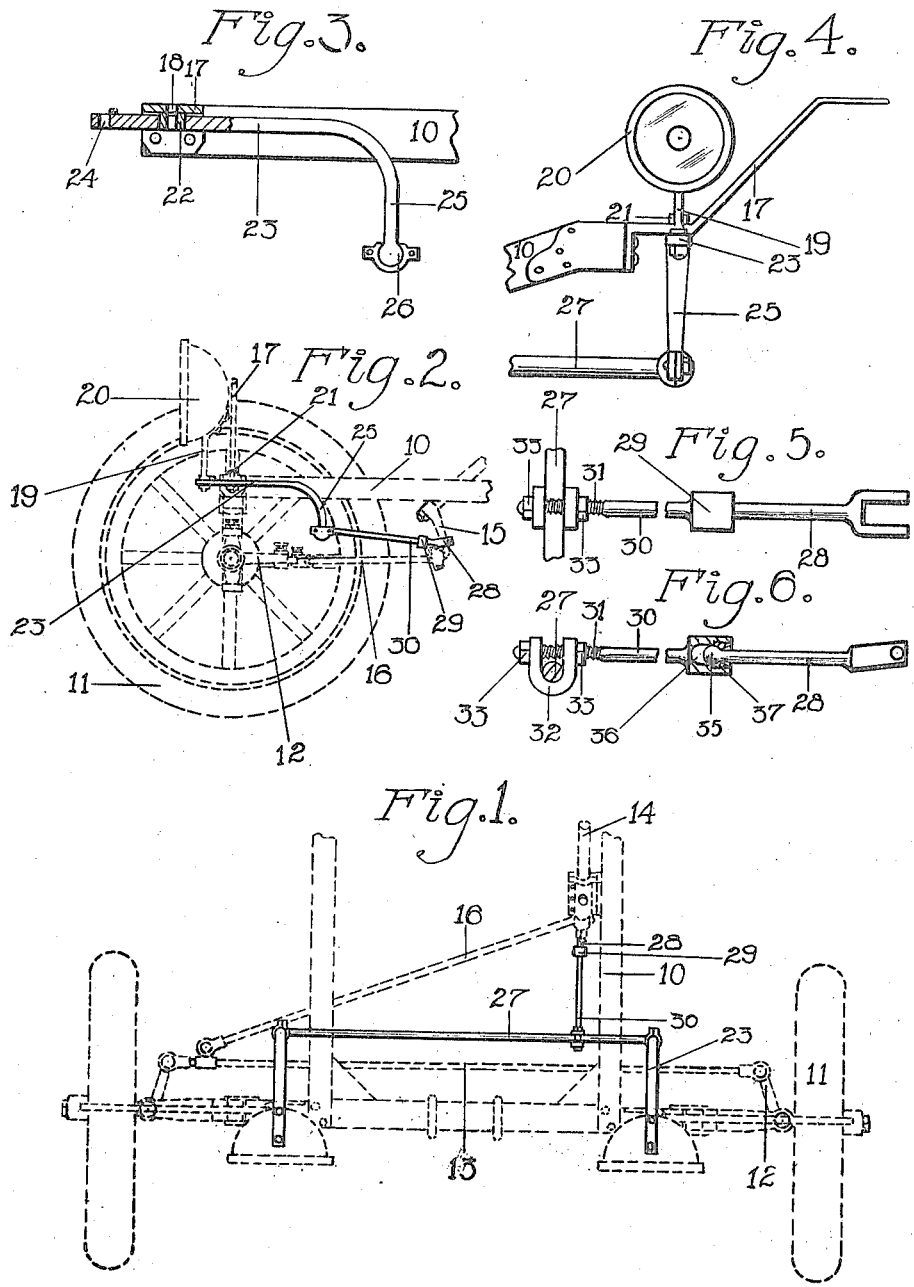

UNITED STATES PATENT OFFICE.

EDWARD WELDON, OF CINCINNATI, IOWA.

AUTOMATICALLY-ADJUSTABLE VEHICLE-LAMP.

1,248,964.

Specification of Letters Patent.

Patented Dec. 4, 1917.

Application filed March 13, 1917. Serial No. 154,603.

*To all whom it may concern:*

Be it known that I, EDWARD WELDON, a citizen of the United States, and resident of Cincinnati, in the county of Appanoose and State of Iowa, have invented a certain new and useful Automatically-Adjustable Vehicle-Lamp, of which the following is a specification.

The object of my invention is to provide an automatically adjustable vehicle lamp adapted to be used on motor vehicles, having steerable front wheels, so constructed and arranged as to be automatically turned by the operation of the steering mechanism to direct rays of light ahead of the car in any direction in which the car is about to travel.

A further object is to provide such a lamp and mechanism for operating the same, which may be used on any ordinary automobile, but particularly adapted for use on Ford cars, and having mechanism so constructed and arranged as to be mounted on the ordinary Ford car.

A further object is to provide such a device having simple and inexpensive parts so constructed that they do not interfere with the ordinary parts of the car, and may be mounted on the car with a minimum amount of additional mechanism other than that of the car as originally assembled.

Still a further object is to provide such device capable of adjustment for taking up wear or for adjusting the device to cars of slightly different construction.

With these and other objects in view, my invention consists in the construction, arrangement, and combination of the various parts of the device, whereby the objects contemplated are attained, as hereinafter more fully set forth, pointed out in my claims, and illustrated in the accompanying drawings, in which:

Figure 1 shows a top or plan view of my improved device, the lamp proper and the parts of the car being shown in dotted lines.

Fig. 2 shows a side elevation of my device, parts of the device being shown in dotted lines.

Fig. 3 shows a detail view, partly in section of part of the mechanism for operating my device.

Fig. 4 shows a front elevation of part of the device.

Fig. 5 shows a top view of part of the operative mechanism, and

Fig. 6 shows a side elevation of the same partly in section.

In the accompanying drawings, I have shown in dotted lines the form of a motor vehicle, such as the Ford, indicated by the reference character 10. The vehicle has the front wheels 11 mounted on stub axles in the ordinary way, which axles are connected with the rearwardly extending arms 12.

Pivoted to the arms 12 is the connecting rod 13. The machine is provided with the ordinary steering post 14, on the lower end of which is fixed the arm 15, to which is pivoted the rod 16 extending diagonally across the car and connected with the connecting rod 13.

The car is provided with brackets 17 having openings 18 to receive the upright rod or the like 19 supporting the lamp 20.

Where my device is used I remove the rod 19 from the opening 18, extending through said opening a bolt 21, on which is a bushing 22 below the bracket 17.

Rotatably mounted on the bushing 22 is an arm 23 having a portion which extends forwardly from the bushing and is provided with an opening 24 receiving the rod 19.

The arm 23 has a rearwardly extending portion, the rear end of which is curved downwardly at 25, and is connected by a ball and socket joint 26 with a transverse rod 27.

It will, of course, be understood that there are two of the arms 23 for thereby supporting two lamps 20, and that the lower rear ends of the arms 23 are connected by the rod 27.

Suitably mounted on the arm 15 is the rear end of a rod 28, which is connected by a universal joint 29, shown in Figs. 6 and 4, and with a similar rod 30 extending rearwardly in the machine. The forward end of the rod is screw-threaded at 31, for a considerable distance.

Mounted on the screw-threaded portion of the rod 30 are the arms of the U-bolt 32, which receives the rod 27. Nuts 33 are adjustably mounted on the screw-threaded portion 31 on opposite sides of the U-bolt 32.

In the practical use of my improved automatically adjustable vehicle lamp, it will be seen that when the arm 15 is operated from the steering post 14, for turning the wheels 11 laterally for steering the vehicle, the rod 27 will be at the same time moved for swinging the rear ends of the arms 23 for thereby moving the lamps 20 to position for throwing the rays of light directly ahead of the car for illuminating the course which the car is about to take.

Another advantage of my device arises from the fact that it can be made as an attachment, and that the parts are of extremely simple and inexpensive construction. They may be installed without interference with the ordinary parts of the car, except the shifting of the lamp, and without interference with the ordinary construction of the car, and without being in the way of the parts already on the car.

Sufficient adjustment is permitted to take up wear of the parts.

Some adjustment of the U-bolt 32 is shown, and the universal joint 29 comprises a socket 35 on the rod 30, the head 36 on the head 28 and a screw-threaded plug 37 adjustably mounted in the socket.

Some changes may be made in the construction, and arrangement of the various parts of my device, and it is my intention to cover by the claims of the patent to be issued upon this application any modified forms of structure or use of mechanical equivalents, which may be included within the reasonable scope of my claims.

I claim as my invention.

1. In a device of the class described, a pair of parallel arms designed to be pivotally mounted between their ends on the frame of a motor vehicle, means for supporting lamps on the forward ends of said arms, the rearward ends of said arms being curved downwardly, a transverse rod, universal joints for connecting the ends of said rod with said downwardly curved ends, a rod designed to be mounted on the arm of a steering post, a third rod, means for universally connecting said third rod with said second rod, and means for adjustably connecting said third rod with said first rod.

2. In a device of the class described, a pair of parallel arms designed to be pivotally mounted between their ends on the frame of a motor vehicle, means for supporting lamps on the forward ends of said arms, the rearward ends of said arms being curved downwardly, a transverse rod, universal joints for connecting the ends of said rod with said downwardly curved ends, a rod designed to be mounted on the arm of a steering post, a third rod, means for universally connecting said third rod with said second rod, said means being capable of adjustment for longitudinally adjusting said second and third rods with relation to each other, and means for adjustably mounting said third rod on said first rod.

3. In a device of the class described, a pair of parallel arms designed to be pivotally mounted between their ends on the frame of a motor vehicle, means for supporting lamps on the forward ends of said arms, the rearward ends of said arms being curved downwardly, a transverse rod having its ends pivotally connected with the rear ends of said arms, a second arm designed to be mounted on the arm of a steering post, a rod designed to properly connect said second arm and the first described rod, said device including means for permitting the forward end of the last described rod to be capable of longitudinal adjustment at its connection with the first described rod.

4. In a device of the class described, a pair of parallel arms designed to be pivotally mounted between their ends on the frame of a motor vehicle, means for supporting lamps on the forward ends of said arms, the rearward ends of said arms being curved downwardly, a transverse rod, having its ends pivotally connected with the rear ends of said first rods, an arm designed to be mounted on the arm of a steering post and a rod adapted to operatively connect the last described arm with the transverse rod, said device including a universal joint between the last described rod and the arm.

Des Moines, Iowa, February 12, 1917.

EDWARD WELDON.

Copies of this patent may be obtained for five cents each, by addressing the "Commissioner of Patents Washington, D. C."